US011977348B2

(12) United States Patent
Kitajima

(10) Patent No.: US 11,977,348 B2
(45) Date of Patent: May 7, 2024

(54) IMAGE FORMING SYSTEM

(71) Applicant: CANON KABUSHIKI KAISHA, Tokyo (JP)

(72) Inventor: Kenichiro Kitajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/968,287

(22) Filed: Oct. 18, 2022

(65) Prior Publication Data

US 2023/0127091 A1 Apr. 27, 2023

(30) Foreign Application Priority Data

Oct. 21, 2021 (JP) ................................ 2021-172136

(51) Int. Cl.
*G03G 15/00* (2006.01)
*G03G 15/22* (2006.01)

(52) U.S. Cl.
CPC ....... *G03G 15/5029* (2013.01); *G03G 15/221* (2013.01); *G03G 15/5016* (2013.01)

(58) Field of Classification Search
CPC ............. G03G 15/5029; G03G 15/221; G03G 15/5016
See application file for complete search history.

(56) References Cited

U.S. PATENT DOCUMENTS 9,959,492 B2 5/2018 Saito
2013/0101303 A1* 4/2013 Kasai ................ G03G 15/2039 399/53

FOREIGN PATENT DOCUMENTS

JP 2016-224111 A 12/2016

* cited by examiner

*Primary Examiner* — Victor Verbitsky
(74) *Attorney, Agent, or Firm* — Venable LLP

(57) ABSTRACT

An image forming system includes an image forming apparatus configured to form a toner image on a recording material, a varnish application apparatus configured to apply a varnish to the recording material, and a control unit. The control unit is configured to apply a first application amount of varnish to the recording material per unit area in a case of executing the image forming job for forming a varnish layer on a recording material having a first grammage, and is configured to apply a second application amount of varnish to the recording material per unit area in a case of executing the image forming job for forming the varnish layer on a recording material having a second grammage lower than the first grammage, the second application amount being higher than the first application amount.

8 Claims, 10 Drawing Sheets

FIG.5

| SHEET TYPE | | | | VARNISH COATING SETTING VALUE | | | |
|---|---|---|---|---|---|---|---|
| TYPE | GRAMMAGE | AIR PERMEABILITY | BRAND | VARNISH TYPE | BASIC SETTING VALUE A [g/m²] | CORRECTION VALUE B [g/m²] | VARNISH APPLICATION AMOUNT SETTING VALUE D=A+B (>0) |
| SHEET TYPE 1 | 50-105 | 3000 | A | UV | 227 | 5 | 232 |
| SHEET TYPE 2 | 106-128 | 5000 | B | UV | 136 | 5 | 141 |
| SHEET TYPE 3 | 129-150 | 10000 | C | UV | 68 | 5 | 73 |
| SHEET TYPE 4 | 151-180 | 20000 | D | UV | 34 | 5 | 39 |
| SHEET TYPE 5 | 221-256 | 30000 | E | UV | 23 | 5 | 28 |

IMAGE FORMING SYSTEM

BACKGROUND OF THE INVENTION

Field of the Invention

The present invention relates to an image forming system including an image forming apparatus that forms a toner image on a recording material and a varnish application apparatus that applies a varnish to the recording material on which the toner image is formed.

Description of the Related Art

Recently, there has been proposed an image forming system including an image forming apparatus that forms a toner image on a recording material and a varnish application apparatus (referred to as a varnish coater) that applies a varnish to the recording material on which the toner image is formed (JP 2016-224111 A). In such an image forming system, a varnish coater applies a varnish to a recording material, so that glossiness of a toner image can be improved as compared with a case where no varnish is applied. Since the glossiness varies depending on the thickness (also referred to as layer thickness) of the varnish layer formed on the recording material, in the image forming system, the application amount of the varnish to be applied by the varnish coater can be adjusted to change the layer thickness of the varnish layer.

However, the thickness of the varnish layer formed on the recording material is affected by the permeability of the varnish into the recording material, and hitherto, in a case where the permeability of the varnish into the recording material is high, since the varnish deeply permeates the recording material, the varnish layer is not formed with a desired layer thickness on the recording material in some cases. In this regard, there has been a demand for a technology that enables adjustment of the application amount of a varnish to be applied by a varnish coater in consideration of the permeability of the varnish into a recording material, but such a technology has not been proposed yet.

SUMMARY OF THE INVENTION

According to a first aspect of the present invention, an image forming system includes an image forming apparatus configured to form a toner image on a recording material, a varnish application apparatus configured to apply a varnish to the recording material, and a control unit configured to control the image forming apparatus and the varnish application apparatus to execute an image forming job for forming the toner image on the recording material and applying the varnish. The control unit is configured to apply a first application amount of varnish to the recording material per unit area in a case of executing the image forming job for forming a varnish layer on a recording material having a first grammage, and is configured to apply a second application amount of varnish to the recording material per unit area in a case of executing the image forming job for forming the varnish layer on a recording material having a second grammage smaller than the first grammage, the second application amount being larger than the first application amount.

According to a second aspect of the present invention, an image forming system includes an image forming apparatus configured to form a toner image on a recording material, a varnish application apparatus configured to apply a varnish to the recording material, a control unit configured to control the image forming apparatus and the varnish application apparatus to execute an image forming job for forming the toner image on the recording material and applying the varnish, and a detection unit provided in the image forming apparatus and configured to detect an air permeability of the recording material before the toner image is formed. The control unit is configured to apply a first application amount of varnish to the recording material per unit area in a case of executing the image forming job for forming a varnish laver on a recording material having a first air permeability, and is configured to apply a second application amount of varnish to the recording material per unit area in a case of executing the image forming job for forming the varnish layer on a recording material having a second air permeability lower than the first air permeability, the second application amount being larger than the first application amount.

Further features of the present invention will become apparent from the following description of exemplary embodiments with reference to the attached drawings.

BRIEF DESCRIPTION OF THE DRAWINGS

FIG. 5 is a diagram illustrating an application amount setting table.

DESCRIPTION OF THE EMBODIMENTS

First Embodiment

Image Forming System

Figure 1:
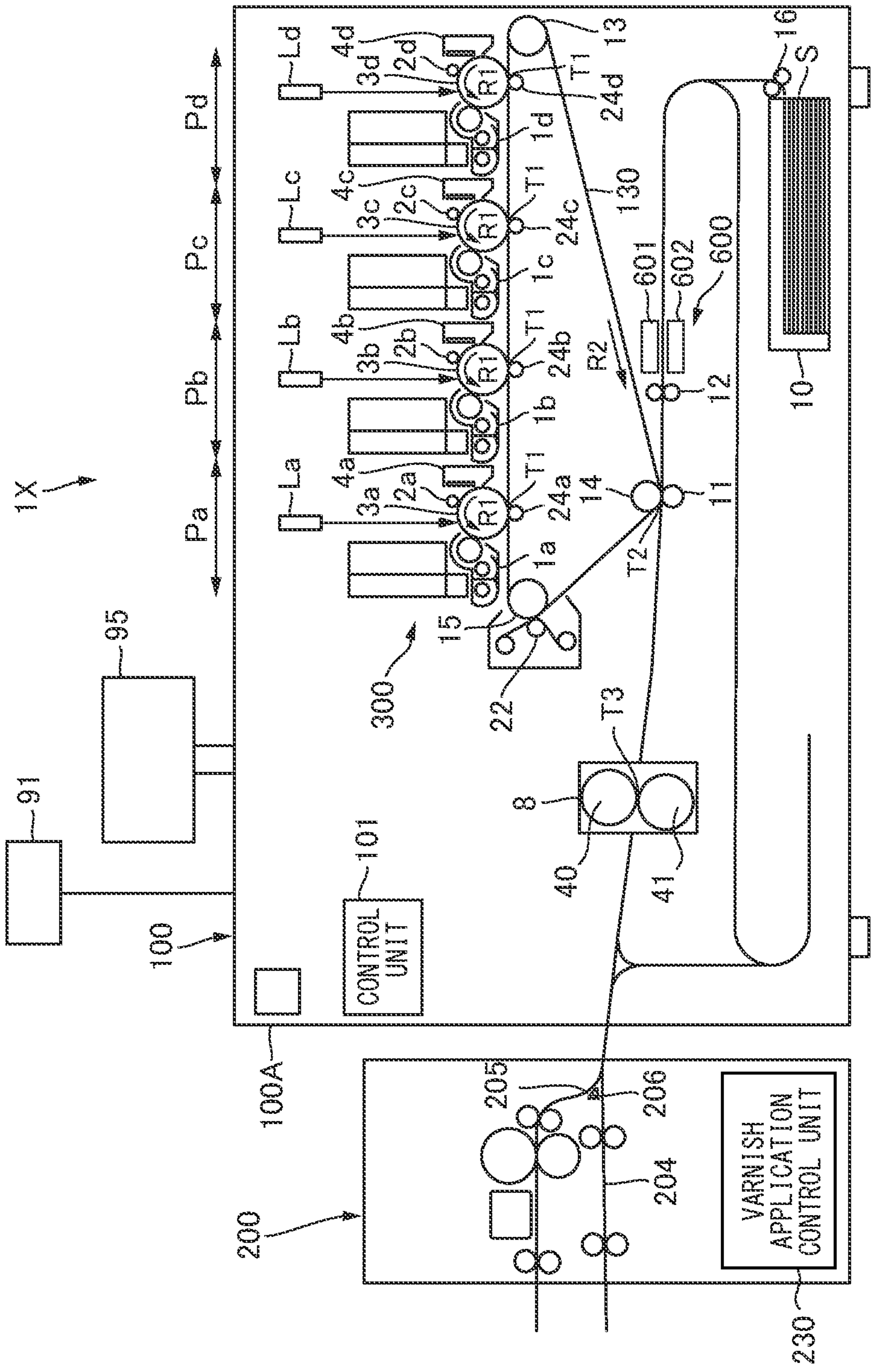
FIG. 1 is a schematic view illustrating an image forming system according to the present embodiment.

An image forming system according to the present embodiment will be described with reference to the drawings. As illustrated in FIG. 1, in an image forming system 1X according to the present embodiment, a varnish application apparatus (referred to as a varnish coater)200 that applies a varnish to a recording material S on which a toner image is fixed by an image forming apparatus 100 is connected to the image forming apparatus 100 that forms the toner image on the recording material S. That is, the image forming system 1X is an in-line system that can automatically convey the recording material S on which the toner image is formed from the image forming apparatus 100 to the varnish coater 200, and consistently perform image forming processing and varnish application processing on the recording material S in response to input of an image forming job.

The varnish coater 200 is configured to be connectable to the image forming apparatus 100 as one of peripheral devices (referred to as optional units or the like) that can be retrofitted to extend the function of the image forming apparatus 100. The varnish coater 200 can apply a varnish to the recording material S discharged from an apparatus body 100A and perform surface processing for the purpose of, for example, increasing the added value of the recording material S by making the recording material glossy, or achieving surface protection. The varnish coater 200 will be described later.

The image forming apparatus 100 will be described with reference to FIG. 1. The image forming apparatus 100 is an electrophotographic tandem-type full-color printer. As illustrated in FIG. 1, the image forming apparatus 100 includes image forming sections Pa, Pb, Pc, and Pd that form a yellow image, a magenta image, a cyan image, and a black image, respectively. The image forming apparatus 100 forms a toner image on the recording material S according to image data from a document reading apparatus (not illustrated) connected to the apparatus body 100A or an external device 91 such as a personal computer connected to the apparatus body 100A in such a way as to be capable of transmitting and receiving a signal.

In the present embodiment, the image forming sections Pa to Pd, primary transfer rollers 24*a* to 24*d*, an intermediate transfer belt 130, a plurality of rollers 13 to 15, and an outer secondary transfer roller 11 are included in an image forming unit 300 that forms a toner image on the recording material S. Examples of the recording material S include various types of sheet materials including paper sheets such as a plain paper sheet, a thick paper sheet, a rough paper sheet, an uneven paper sheet, and a coated paper sheet, a plastic film, cloth, and the like.

As illustrated in FIG. 1, the image forming sections Pa, Pb, Pc, and Pd are arranged side by side in a moving direction of the intermediate transfer belt 130 in the apparatus body 100A. The intermediate transfer belt 130 is stretched around the plurality of rollers (13, 14, and 15) and moved in an arrow R2 direction. Then, the intermediate transfer belt 130 carries and conveys a primarily transferred toner image. The outer secondary transfer roller 11 is arranged in such a wav as to face an inner secondary transfer roller 14 around which the intermediate transfer belt 130 is stretched with the intermediate transfer belt 130 interposed therebetween, thereby configuring a secondary transfer nip portion T2 that transfers the toner image on the intermediate transfer belt 130 to the recording material S. A fixing unit 8 is arranged downstream the secondary transfer nip portion T2 in a recording material conveyance direction.

A cassette 10 in which the recording material S is accommodated is arranged on the lower side of the image forming apparatus 100. The recording material S is conveyed from the cassette 10 toward a registration roller 12 by a conveying roller 16. Thereafter, the registration roller 12 starts to rotate in synchronization with the toner image formed on the intermediate transfer belt 130 as described later, whereby the recording material S is conveyed to the secondary transfer nip portion T2. Although only one cassette 10 is illustrated here, a plurality of cassettes 10 may be arranged in such a way as to be able to store the recording materials S having different sizes and thicknesses, and in this case, the recording material S is selectively conveyed from any of the plurality of cassettes 10. Further, the recording material S is not limited to the recording material S stored in the cassette 10, and the recording material S loaded on a manual sheet feed portion (not illustrated) may be conveyed.

Four image forming sections Pa, Pb, Pc, and Pd included in the image forming apparatus 100 have substantially the same configuration except that developing colors are different. Therefore, here, the yellow image forming section Pa will be described as a representative, and a description of the other image forming sections Pb, Pc, and Pd will be omitted.

In the image forming section Pa, a cylindrical photosensitive drum 3*a* is provided as a photosensitive member. The photosensitive drum 3*a* is rotationally driven in an arrow R1 direction. A charging unit 2*a*, an exposing unit La, a developing unit 1*a*, a primary transfer roller 24*a*, and a drum cleaning unit 4*a* are arranged around the photosensitive drum 3*a*.

For example, a process of forming a full-color image by the image forming apparatus 100 will be described. First, once an image forming operation is started, the surface of the rotating photosensitive drum 3*a* is uniformly charged by the charging unit 2*a*. The charging unit 2*a* is, for example, a corona charger that radiates charge particles associated with corona discharge to charge the photosensitive drum 3*a* to a uniform negative dark potential. Next, the photosensitive drum 3*a* is scanned and exposed by laser light corresponding to an image signal emitted from the exposing unit La. As a result, an electrostatic latent image corresponding to the image signal is formed on the surface of the photosensitive drum 3*a*. The electrostatic latent image formed on the photosensitive drum 3*a* is developed into a toner image that is a visible image by a developer containing toner and a carrier stored in the developing unit 1*a*. In the present embodiment, each of the developing units 1*a* to 1*d* uses a two-component developer containing nonmagnetic toner and a magnetic carrier. As the toner, a toner having a low melting point and containing a wax as a binder resin, a colorant, and a release agent is used.

The toner image formed on the photosensitive drum 3*a* is primarily transferred to the intermediate transfer belt 130 at a primary transfer nip portion T1 formed between the primary transfer roller 24*a* and the photosensitive drum 3*a* arranged with the intermediate transfer belt 130 interposed therebetween. At this time, a primary transfer voltage is applied to the primary transfer roller 24*a* The toner remaining on the surface of the photosensitive drum 3*a* after the primary transfer is removed by the drum cleaning unit 4*a*.

Such an operation is sequentially performed in the yellow, magenta, cyan, and black image forming sections Pa to Pd, and toner images of four colors are superimposed on the intermediate transfer belt 130. Thereafter, the recording material S accommodated in the cassette 10 is conveyed to the secondary transfer nip portion T2 in accordance with a toner image formation timing. Then, as a secondary transfer voltage is applied to the outer secondary transfer roller 11, the full-color toner image formed on the intermediate transfer belt 130 is secondarily transferred collectively to the recording material S. The toner remaining on the intermediate transfer belt 130 after the secondary transfer is removed by a belt cleaning unit 22.

The recording material S to which the toner image is transferred is conveyed to the fixing unit 8. In the fixing unit 8, the recording material S carrying the toner image is nipped and conveyed at a fixing nip portion T3 formed by a fixing roller 40 and a pressure roller 41, and heat and pressure are applied to the recording material S. By such heating and pressurization, the toner of the toner image carried on the recording material S is melted and mixed, and fixed to the recording material S as a full-color image. The recording material S on which the toner image is fixed by the fixing unit 8 is conveyed from the image forming apparatus 100 to the varnish coater 200.

In the present embodiment, a varnish application route 205 in which the varnish is applied to the recording material S and a varnish bypass route 204 in which the varnish is not applied to the recording material S are separately provided in the varnish coater 200, and a conveyance path for the recording material S can be headed to any one of the two routes. That is, by operating a flapper 206, the recording material S can be conveyed to the varnish application route 205 in a case of applying the varnish, and the recording material S can be conveyed to the varnish bypass route 204 in a case of applying no varnish.

Varnish Coater

Figure 2:
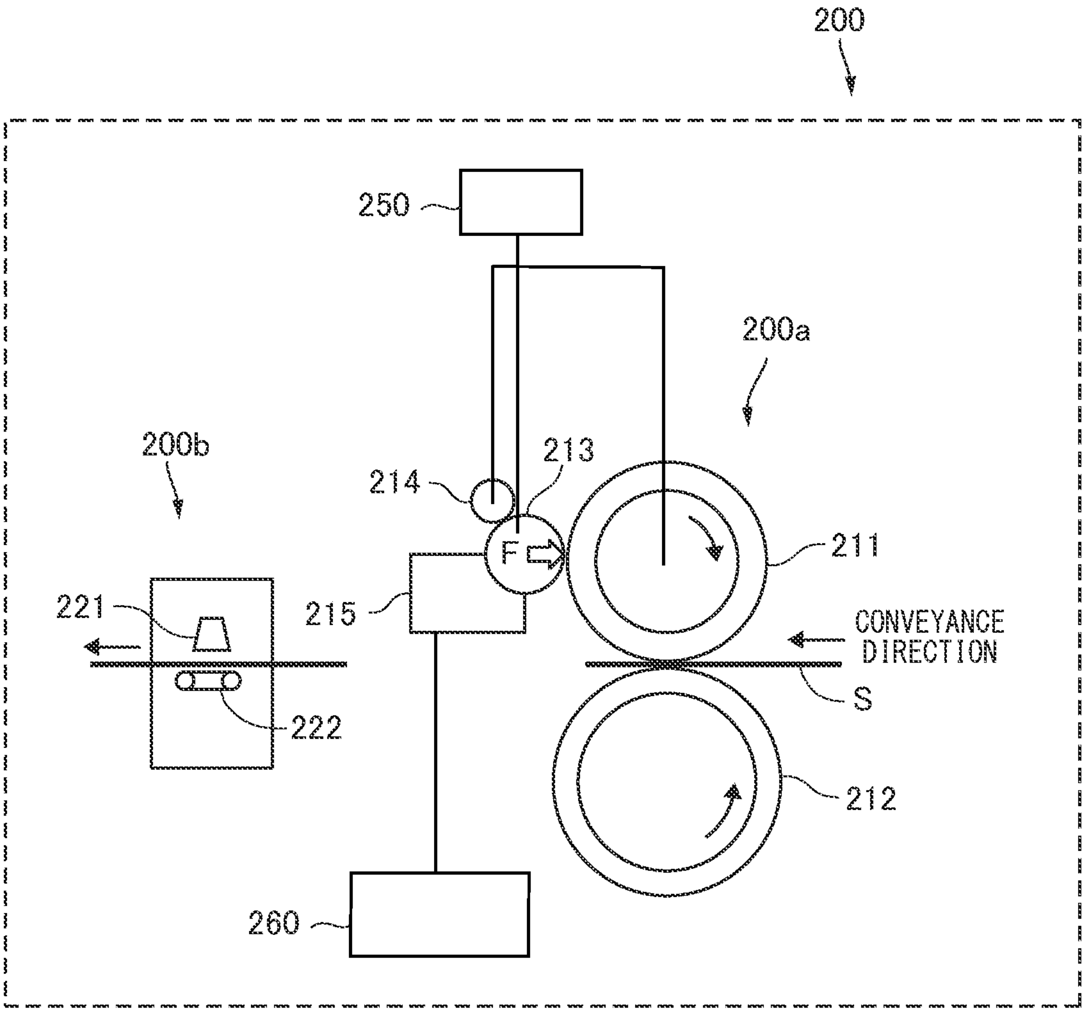
FIG. 2 is a schematic view illustrating a varnish coater.

Next, the varnish coater 200 will be described with reference to FIG. 2. FIG. 2 illustrates, as an example of the varnish coater, the roll coater type varnish coater 200 capable of forming a varnish layer over the entire surface of the recording material S by using an ultraviolet curable UV varnish that is cured with ultraviolet rays. As illustrated in FIG. 2, the varnish coater 200 includes a varnish application unit 200*a* and a varnish solidifying unit 200*b*.

The varnish application unit 200*a* includes a varnish application roller 211, a counter roller 212, a feed roller 213, a regulating roller 214, and a varnish reservoir 215. The varnish application roller 211, the feed roller 213, and the regulating roller 214 are provided in such a way as to be rotatable by a motor 250. The counter roller 212 is in contact with the varnish application roller 211 to form a nip portion capable of nipping and conveying the recording material S. The varnish reservoir 215 holds a varnish liquid to be applied to the recording material S. The upper side of the varnish reservoir 215 has an opening, and a part of the outer peripheral surface of the feed roller 213 enters through this opening and is immersed in the varnish liquid. Therefore, the feed roller 213 can carry the varnish liquid on the outer peripheral surface by rotating. The regulating roller 214 regulates and uniformly spreads the varnish carried on the outer peripheral surface of the feed roller 213 in such a way that the varnish carried on the outer peripheral surface is carried downstream in a rotation direction while having the same thickness in a rotational axis direction.

The varnish reservoir 215 and the feed roller 213 are integrally movable by an actuator 260 between a contact position where the feed roller 213 comes into contact with the surface of the varnish application roller 211 and a separation position where the feed roller 213 does not come into contact with the surface of the varnish application roller 211. Ina case where the feed roller 213 and the varnish reservoir 215 are moved in an arrow F direction in the drawing, the feed roller 213 comes into contact with the surface of the varnish application roller 211. Once the feed roller 213 carrying the varnish liquid has rotated to reach the contact position, the varnish liquid is supplied from the feed roller 213 to the varnish application roller 211.

In a case of such a varnish application unit 200*a*, the application amount of the varnish per unit area with respect to the recording material S varies depending on the supply amount of the varnish supplied from the feed roller 213 to the varnish application roller 211. The supply amount of the varnish supplied from the feed roller 213 to the varnish application roller 211 is determined by the rotational speed of the feed roller 213 and the contact pressure between the feed roller 213 and the varnish application roller 211. That is, the amount of varnish that can be carried by the feed roller 213 by rotation is changed by changing the rotational speed of the feed roller 213. The carrying amount of the varnish supplied from the feed roller 213 and carried by the varnish application roller 211 can be changed by changing the contact pressure between the feed roller 213 and the varnish application roller 211. The recording material S is nipped and conveyed by the varnish application roller 211 and the counter roller 212, and the varnish carried by the varnish application roller 211 at that time is applied to the surface of the recording material S.

The recording material S having one surface side to which the varnish is applied in this manner is conveyed from the varnish application unit 200*a* to the varnish solidifying unit 200*b*. The varnish solidifying unit 200*b* includes a varnish solidifying section 221 and a sheet conveyance section 222. The recording material S is conveyed to the varnish solidifying section 221 downstream in a conveyance direction by the sheet conveyance section 222, and the varnish on the recording material S is solidified by the varnish solidifying section 221. The varnish solidifying section 221 serving as an irradiation unit includes an ultraviolet lamp, and the ultraviolet lamp performs irradiation with UV light having a wavelength corresponding to the varnish to solidify the varnish applied to the recording material S.

Note that an application unit that applies the varnish to the recording material S is not limited to the roll coater type using the varnish application roller 211 and the counter roller 212, and for example, an inkjet type using a line head may be used. In a case of using the line head, not only the varnish laver is formed by applying the varnish to the entire surface of the recording material S, but also a varnish image such as a character or a figure can be formed at an arbitrary position on the recording material S. Although the UV varnish has been described as an example of the varnish, the varnish is not limited thereto, and an oily varnish or an aqueous varnish may be used. However, in a case of using the oily varnish or the aqueous varnish, it is desirable to use an infrared (IR) lamp as a drying unit that dries the varnish rather than using the ultraviolet lamp. In addition, the varnish may be dried with hot air, or the varnish may be dried using the IR lamp and hot air in combination.

Control Configuration of Image Forming System

Next, a control configuration of the image forming system 1X will be described by using FIG. 3 with reference to FIGS. 1 and 2. In the present embodiment, a case where the image forming apparatus 100 (specifically, a main control unit 101) integrally manages operation commands for the varnish coater 200 and controls them will be described as an example. Although various devices such as a motor and a power supply are connected in addition to those illustrated in FIG. 3, illustration and description thereof are omitted here because it is not the gist of the invention.

Figure 3:
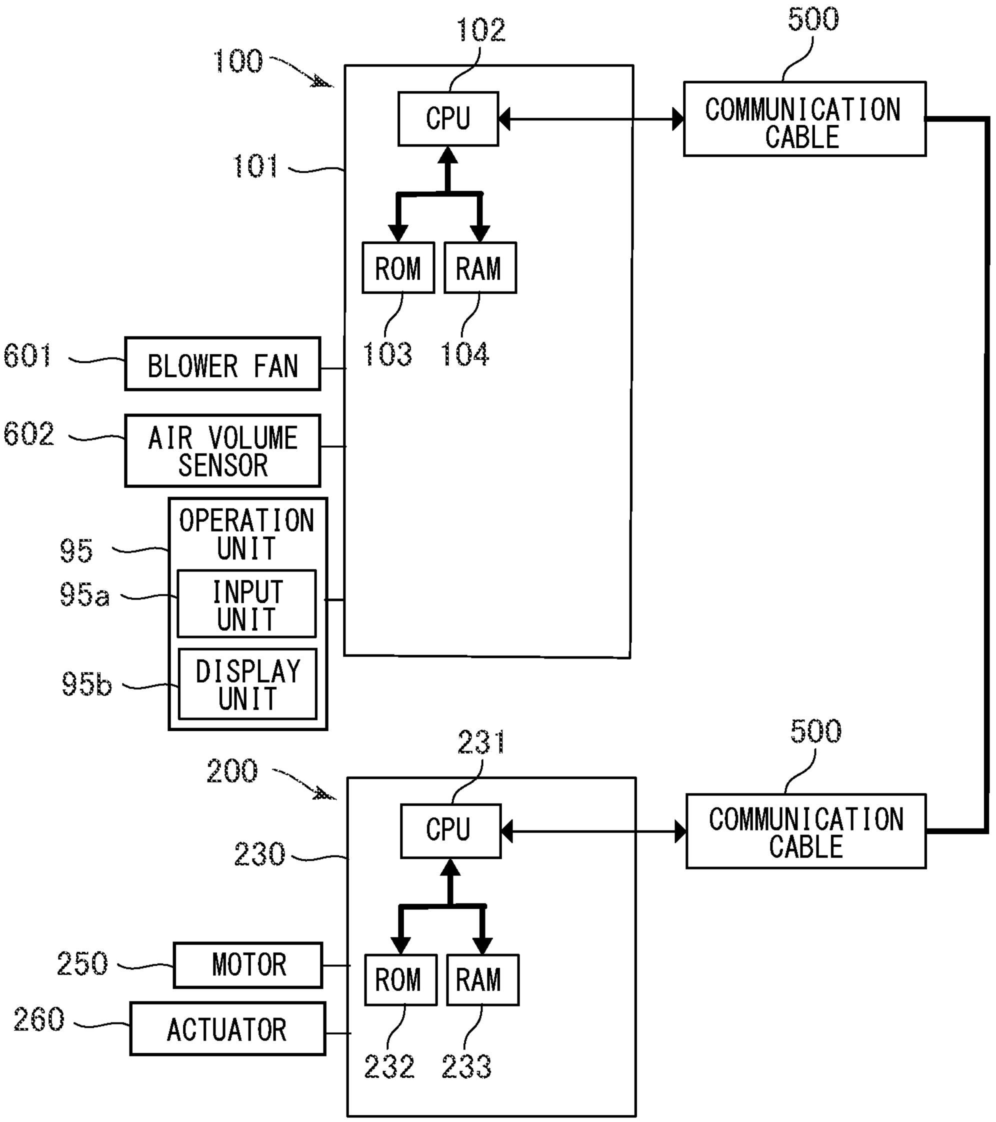
FIG. 3 is a control block diagram of the image forming system.

In the image forming system 1X according to the present embodiment, as illustrated in FIG. 3, a varnish application control unit 230 is connected to the main control unit 101 provided in the image forming apparatus 100 via a communication cable 500 in such a way as to be able to communicate an operation command, various data, and the like. The varnish application control unit 230 provided in the varnish coater 200 is operated m accordance with an operation command from the main control unit 101. That is, the main control unit 101 can control the entire image forming system 1X by transmitting an operation command to the varnish coater 200 while controlling the operation of the image forming apparatus 100.

The main control unit 101 and the varnish application control unit 230 may have the same configuration. For example, the main control unit 101 and the varnish application control unit 230 each include a central processing unit (CPU), a read only memory (ROM), and a random access memory (RAM).

Figure 4:
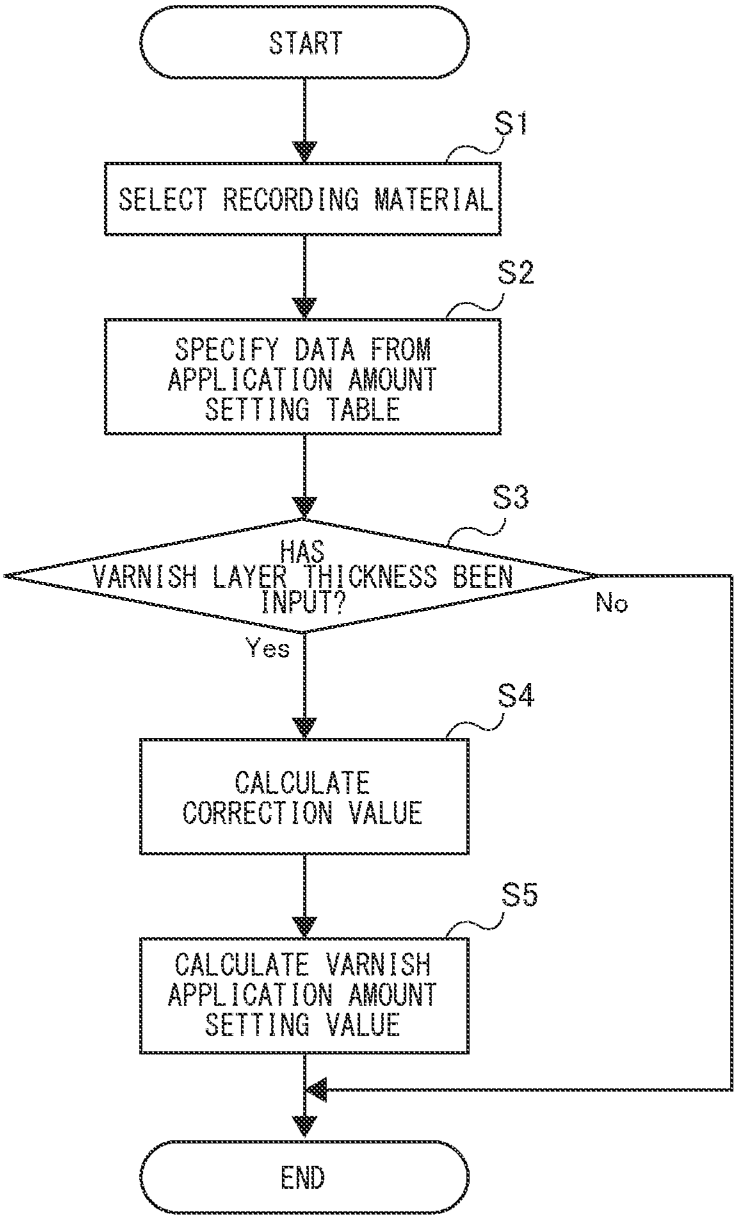
FIG. 4 is a flowchart illustrating application amount setting processing.

The main control unit 101 serving as a control unit includes a CPU 102, a ROM 103, and a RAM 104. The ROM 103 and the RAM 104 store various programs such as application amount adjustment processing (see FIG. 4) and image formation control processing (see FIG. 7) to be described later, and various data such as an application amount setting table (see FIG. 5). Note that the RAM 104 can also temporarily store calculation processing results and the like accompanying the execution of various programs. The varnish application control unit 231 includes a CPU 232, a ROM 233, and a RAM 234. The CPU 232 operates the varnish coater 200 based on a control program stored in the ROM 233.

The image forming apparatus 100 includes an operation unit 95 (see FIG. 1), and the operation unit 95 is connected to the main control unit 101. The operation unit 95 includes an input unit 95*a* and a display unit 95*b*. The input unit 95*a* is, for example, an operation panel or the like through which instructions to execute various programs such as an image forming job by a user, various data, and the like can be received. According to the present embodiment, it is possible to input an instruction to execute an image forming job for forming a toner image on the recording material S and applying a varnish. The display unit 95*b* serving as a display unit is, for example, a liquid crystal monitor or the like capable of displaying various screens such as a "varnish application amount correction screen" to be described later or a menu screen presenting various executable programs.

Furthermore, the external device 91 such as a personal computer can be connected to the main control unit 101, and image data, an instruction to execute various programs, various data, and the like can be acquired from the external device 91. The operation unit 95 may be a touch panel that displays various screens on the display unit 95*b* and can receive start inputs of various programs and inputs of various data according to a touch operation on the screen by a user.

The motor 250 that rotates the varnish application roller 211, the feed roller 213, and the regulating roller 214, and the actuator 260 that integrally moves the varnish reservoir 215 and the feed roller 213 are connected to the main control unit 101. As described above, the main control unit 101 controls the motor 250 and the actuator 260 to adjust the supply amount of the varnish supplied from the feed roller 213 to the varnish application roller 211, thereby making it possible to change the application amount of the varnish per unit area with respect to the recording material S.

Application Amount Setting Processing

Next, the "application amount setting processing" for setting the application amount (g/m$^2$) of the varnish per unit area with respect to the recording material S will be described with reference to FIGS. 1 and 3 and FIGS. 4 to 6. Although not illustrated, the "application amount setting processing" according to the present embodiment is started by the main control unit 101, for example, in response to an operation of a print button (not illustrated) on an initial screen displayed on the display unit 95*b* by a user.

The main control unit 101 displays a "print setting screen" (not illustrated) on the display unit 95*b* in response to the operation of the print button, and waits for the processing until the user selects the recording material S on the "print setting screen" (S1). In a case where the user performs an operation other than selecting the recording material S, the main control unit 101 may cause the display unit 95*b* to perform transition from, for example, the "print setting screen" to another screen such as the initial screen. In a case where the user performs the operation of selecting the recording material S, the main control unit 101 specifies a "varnish coating setting value" according to the type of the selected recording material S from the "application amount setting table" (see FIG. 5) stored in the ROM 103 or the RAM 104 serving as a storage (S2).

Application Amount Setting Table

FIG. 5 illustrates an example of the "application amount setting table". The grammage (g/m$^2$) and an air permeability (seconds) of the recording material S for each of "sheet types 1 to 5" described above, and brands added by the user to distinguish the "sheet types 1 to 5" are stored in the "application amount setting table". In FIG. 5, brands "A to E" in which the air permeability increases as the grammage increases are taken as an example. In the present specification, as the air permeability of the recording material S, a time (seconds) required for a defined volume of air to pass through in a thickness direction of the recording material S is indicated.

In the "application amount setting table", the "varnish coating setting values" are stored for each of the "sheet types 1 to 5". As the "varnish coating setting values", a varnish type, a basic setting value (reference value), a correction value (application amount correction value), and a varnish application amount setting value are stored. The varnish type is the type of a varnish to be applied to the recording material S by the varnish coater 200, and FIG. 5 illustrates an example in which the same type of varnish, the "UV varnish", is stored.

The basic setting value (g/m$^2$) is a varnish application amount (lower limit value) that enables the varnish to be formed at a minimum varnish laver thickness (for example, 100 μm) at which glossiness can be obtained even after the varnish permeates on the premise that the varnish applied to various recording materials S permeates, and a value obtained by an experiment or the like is set in advance. The basic setting value set for the recording material S having a small grammage (air permeability) such as the "sheet type 4" is larger than the basic setting value set for the recording material S having a large grammage (air permeability) such as the "sheet type 5".

This is because in a case where the air permeability of the recording material S is, for example, "40,000 seconds (JIS P8117)" or more, the varnish is less likely to permeate the recording material S. That is, as the air permeability of the recording material S increases, the permeability of the varnish into the recording material S decreases. In other words, as the air permeability of the recording material S decreases, the permeability of the varnish into the recording material S increases. Therefore, even in a case where the varnish is applied at the same application amount, in a case of the recording material S for which the permeability of the varnish is high, a larger amount of the varnish permeates the recording material S than in a case of the recording material S for which the permeability of the varnish is low, and thus, the layer thickness of the varnish laver formed on the recording material S is smaller than that in a case where the permeability of the varnish is low. Therefore, as a lower limit value of the varnish application amount that can make the layer thickness of the varnish layer actually formed on the recording material S the same between a case where the permeability of the varnish is high (the air permeability is low) and a case where the permeability of the varnish is low (the air permeability is high), the basic setting value is set to a larger value for the recording material S having a low air permeability than for the recording material S having a high air permeability.

In FIG. 5, the types of the recording materials S in which the air permeability increases as the grammage increases have been described as an example for the basic setting value, but the type of the recording material S is not limited thereto, and there are also types of recording materials S having the same grammage and different air permeabilities. Even in this case, the basic setting value is set to a larger value for the recording material S having a low air permeability than for the recording material S having a high air permeability among the recording materials S having the same grammage.

The correction value B is a varnish application amount (referred to as an initial application amount) corresponding to the varnish layer thickness included as information in the received image data, or a varnish application amount corresponding to the varnish layer thickness input through the operation unit 95, the external device 91, or the like. The user can input a desired varnish layer thickness through the operation unit 95, the external device 91, or the like, thereby changing the thickness of the varnish with respect to the recording material S based on the thickness of the varnish formed by the initial application amount.

Figure 6:
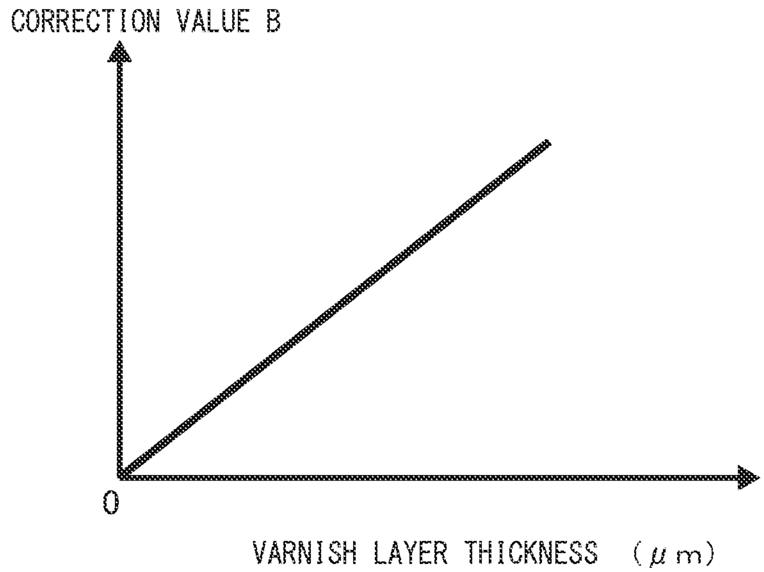
FIG. 6 is a graph illustrating a relationship between a varnish layer thickness and a correction value.

FIG. 6 illustrates a relationship between the varnish layer thickness and the correction value B. As illustrated in FIG. 6, the varnish layer thickness (μm) and the correction value B ($g/m^2$) are in a direct proportional relationship, and it is necessary to apply a larger amount of varnish in order to increase the varnish layer thickness. According to the relationship illustrated in FIG. 6, the varnish application amount corresponding to the varnish layer thickness is obtained based on the varnish layer thickness included as information in the received image data or the varnish layer thickness input through the operation unit 95, the external device 91, or the like. The relationship between the varnish layer thickness and the correction value B illustrated in FIG. 6 does not vary depending on the grammage of the recording material S, but may vary depending on the varnish type.

Returning to FIG. 5, the varnish application amount setting value is obtained as indicated by the following Expression (1), and is the amount of the varnish to be applied to the recording material S by the varnish coater 200 at the time of executing the image forming job per unit area. According to the present embodiment, the varnish layer thickness is adjusted by the correction value B on the premise of a state in which the varnish layer is formed at the minimum varnish layer thickness at which the glossiness can be obtained even after the varnish permeates the recording material S, that is, a state in which the varnish permeates the recording material S and then does not permeate any more (basic setting value).

$$\text{Varnish application amount setting value } D = \text{Basic setting value } A + \text{Correction value } B \qquad \text{Expression (1)}$$

Returning to FIG. 4, the main control unit 101 determines whether or not the varnish layer thickness on the recording material S has been input (S3). Whether or not the varnish layer thickness has been input depends on whether or not the varnish layer thickness has been input through the operation unit 95, the external device 91, or the like. In a case where the varnish layer thickness has not been input (No in S3), the main control unit 101 ends the processing. On the other hand, in a case where the varnish layer thickness has been input (Yes in S3), the main control unit 101 obtains the correction value B according to the relationship between the varnish layer thickness and the correction value B illustrated in FIG. 6 as described above, and sets the correction value B in the "application amount setting table" (see FIG. 5) (S4). Then, the main control unit 101 calculates a varnish application amount setting value D according to the above-described Expression (1) and sets the calculated varnish application amount setting value D in the "application amount setting table" (S5).

Image Formation Control Processing

Figure 7:
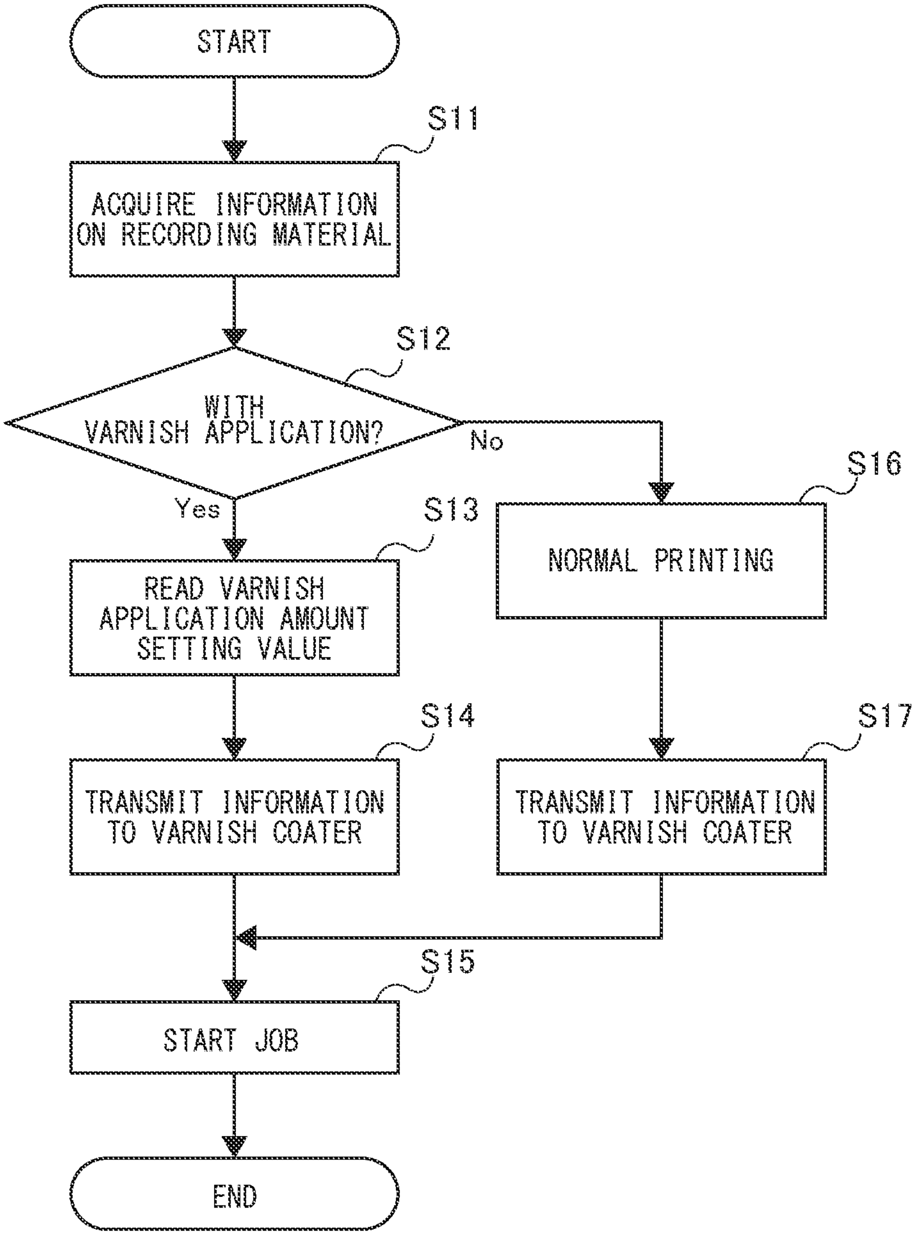
FIG. 7 is a flowchart illustrating image forming control processing.

Next, the "image formation control processing" according to the present embodiment will be described by using FIG. 7 with reference to FIGS. 1 and 3. Although not illustrated, the "image forming control processing" described herein is started by the main control unit 101, for example, in response to an operation of an image formation start button (not illustrated) on the initial screen displayed on the display unit 95*b* by the user.

The main control unit 101 acquires information (type, size, or the like) on the recording material S input through the operation unit 95, the external device 91, or the like by the user (S11). In addition, the main control unit 101 determines whether or not an instruction to execute the image forming job for forming a toner image on the recording material S and applying the varnish has been given by the user through the operation unit 95, the external device 91, or the like, or whether or not "with varnish application" for the recording material S has been input (S12). Ina case of "without varnish application" (No in S12), the main control unit 101 selects a normal image forming job (S16), and transmits information indicating that the printed matter is the printed matter without varnish application to the varnish coater 200 (S17). Thereafter, the main control unit 101 starts the job (normal mode)(S15), and causes the image forming apparatus 100 to perform the image forming processing, but does not cause the varnish coater 200 to perform the varnish application processing, thereby outputting, as the printed matter, the recording material S on which no varnish layer is formed.

On the other hand, in a case of "with varnish application" (Yes in S12), the main control unit 101 reads the corresponding "varnish application amount setting value" from the "application amount setting table" (see FIG. 5) according to the input grammage of the recording material S (S13). Then, the main control unit 101 transmits information indicating that the printed matter is the printed matter with varnish application and the read "varnish application amount setting value" to the varnish coater 200 (S14). Thereafter, the main control unit 101 starts the job (varnish application mode) (S15), causes the image forming apparatus 100 to perform the image forming processing, and causes the varnish coater 200 to perform the varnish application processing, thereby outputting, as the printed matter, the recording material S on which the varnish layer is formed.

The layer thickness of the varnish layer formed on the recording material S will be specifically described with reference to FIG. 5. Here, a case where a varnish layer having the same layer thickness (for example, 100+20 μm) is formed on the recording materials S of the "sheet types 1 to 5" will be described as an example. To this end, as illustrated in FIG. 5, the correction values B of the "sheet types 1 to 5" are all set to "5 $g/m^2$" corresponding to the same layer thickness (20 μm).

In FIG. 5, since the basic setting value for the "sheet type 1 (with the grammage of 50 to 105)" is "227" and the correction value is "5", the varnish application amount setting value is "232". Therefore, for the "sheet type 1", a varnish with the varnish application amount setting value of "232" is applied to form a varnish layer with a laver thickness of "120 μm". Since the basic setting value for the "sheet type 2" is "136" and the correction value is "5", the varnish application amount setting value is "141". Therefore, for the "sheet type 2 (with the grammage of 106 to 128)", a varnish with the varnish application amount setting value of "141" is applied to form a varnish layer with a layer thickness "120 μm". Since the basic setting value for the "sheet type 3 (with the grammage of 129 to 150)" is "68" and the correction value is "5", the varnish application amount setting value is "73". Therefore, for the "sheet type 3", a varnish with the varnish application amount setting value of "73" is applied to form a varnish layer with a layer thickness of "120 μm". Since the basic setting value for the "sheet type 4 (with the grammage of 151 to 180)" is "34" and the correction value is "5", the varnish application amount setting value is "39". Therefore, for the "sheet type 4", a varnish with the varnish application amount setting value of "39" is applied to forma varnish laver with a layer thickness of "120 μm". Since the basic setting value for the "sheet type 5 (with the grammage of 221 to 256)" is "23" and the correction value is "5", the varnish application amount setting value is "28". Therefore, for the "sheet type 5", a varnish with the varnish application amount setting value of "28" is applied to form a varnish layer with a layer thickness of "120 μm".

As described above, in the present embodiment, when a varnish layer having the same thickness is formed at the time of executing the image forming job for forming a toner image on the recording material S and applying the varnish to the recording material S, in a case where the recording material S has a first grammage, a first application amount of varnish is applied to the recording material S per unit area. Then, in a case where the recording material S has a second grammage smaller than the first grammage, a second application amount of varnish is applied to the recording material S per unit area, the second application amount being larger than the first application amount.

As described above, in the present embodiment, the varnish application amount is determined using the application amount setting table in which the basic setting value, the correction value, and the varnish application amount setting value are stored. That is, at the time of executing the image forming job for forming a toner image on the recording material S and applying the varnish, the varnish application amount setting value corresponding to the grammage of the recording material S is read with reference to the application amount setting table, and the varnish is applied according to the read varnish application amount setting value. The varnish application amount setting value is obtained by adding the basic setting value and the correction value, and is the amount of the varnish to be applied to the recording material S by the varnish coater 200 at the time of executing the image forming job per unit area. According to the present embodiment, the varnish layer thickness is adjusted by the correction value, and the basic setting value is determined on the premise of a state in which the varnish layer is formed at the minimum varnish layer thickness at which the glossiness can be obtained even after the varnish permeates the recording material S, that is, a state in which the varnish permeates the recording material S and then does not permeate anymore. Therefore, the recording material S for which the varnish layer thickness has been corrected using the correction value is output on the premise that the varnish layer is formed at the minimum varnish layer thickness at which the glossiness can be obtained even after the varnish permeates the recording material S, that is, a state in which the varnish permeates the recording material and then does not permeate any more. As described above, according to the present embodiment, the application amount of the varnish to be applied by the varnish coater 200 can be adjusted in consideration of the permeability of the varnish into the recording material S in order to create a glossy printed matter in the image forming system 1X including the varnish coater 200.

Second Embodiment

In the above-described embodiment, a case where the varnish is applied according to the varnish application setting value corresponding to the grammage of the recording material S with reference to the application amount setting table (see FIG. 5) has been described, but the present invention is not limited thereto, and the varnish may be applied according to the varnish application setting value corresponding to the air permeability of the recording material S. Hereinafter, a description thereof will be provided.

As illustrated in FIG. 1, in the present embodiment, in the image forming apparatus 100, an air permeability detection unit 600 is provided upstream of the registration roller 12 (upstream in a recording material S conveyance direction) in order to measure the air permeability of the recording material S. The air permeability detection unit 600 is provided to measure the air permeability of the recording material S based on the air volume of the air passing through the recording material S as the air is blown from one surface to the other surface of the recording material S temporarily stopped at the position of the registration roller 12 in such a way that the air passes through the recording material S.

The air permeability detection unit 600 serving as a detection unit includes a blower fan 601 that can blow air having a predetermined air volume (flow velocity) to the recording material S. and an air volume sensor 602 that detects the air volume of the air passing through the recording material S. The blower fan 601 and the air volume sensor 602 are arranged to face each other in the conveyance path for the recording material S in such a way that the blower fan 601 blows air from one surface and the air volume sensor 602 can detect the air volume of the air passing through the recording material S. The blower fan 601 and the air volume sensor 602 are connected to the main control unit 101 (see FIG. 3), and the main control unit 101 controls the air volume of the blower fan 601. In addition, the main control unit 101 acquires the air volume detected by the air volume sensor 602, and obtains the air permeability of the recording material S based on the acquired air volume.

Figure 8:
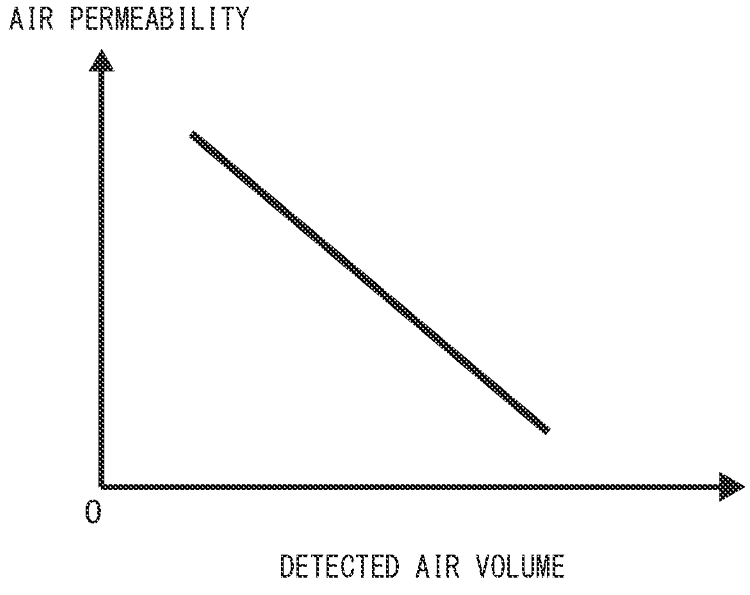
FIG. 8 is a graph illustrating a relationship between an air volume and an air permeability.

Here, a relationship between the air volume detected by the air volume sensor 602 and the air permeability of the recording material S will be described with reference to FIG. 8. As illustrated in FIG. 8, the air volume (m/s) and the air permeability are in an inverse proportional relationship, and as the air volume of the air passing through the recording material S increases, the air permeability of the recording material S decreases, that is, the varnish easily permeates the recording material S. The main control unit 101 obtains the air permeability of the recording material S based on the acquired air volume detected by the air volume sensor 602 according to the relationship between the air volume and the air permeability illustrated in FIG. 8. The relationship between the air volume and the air permeability illustrated in FIG. 8 may vary depending on the grammage of the recording material S.

In the present embodiment, as illustrated in FIG. 5, the "application amount setting table" stores the air permeability of the recording material S of each of the "sheet types 1 to 5" described above. At the time of executing the image forming job for forming a toner image on the recording material S and applying the varnish, the main control unit 101 applies the varnish based on the varnish application amount setting value corresponding to the air permeability of the recording material S with reference to the "application amount setting table". In the present embodiment, when a varnish layer having the same thickness is formed at the time of executing the image forming job for forming a toner image on the recording material S and applying the varnish to the recording material S, in a case where the recording material S has a first air permeability, a first application amount of varnish is applied to the recording material S per unit area. Then, in a case where the recording material S has a second air permeability lower than the first air permeability, a second application amount of varnish is applied to the recording material S per unit area, the second application amount being larger than the first application amount.

In the present embodiment, the air permeability of the blank recording material S before an image is transferred is actually measured, the varnish application amount setting value corresponding to the measured air permeability of the recording material S is read with reference to the application amount setting table, and the varnish is applied according to the read varnish application amount setting value. With such a configuration, the permeability of the varnish into the recording material S can be obtained in a timely manner by detecting the air permeability of the recording material S as compared with a case where the varnish is applied according to the varnish application setting value corresponding to the grammage of the recording material S. Therefore, a varnish layer having a desired layer thickness can be more appropriately formed.

Registration Processing

Figure 9:
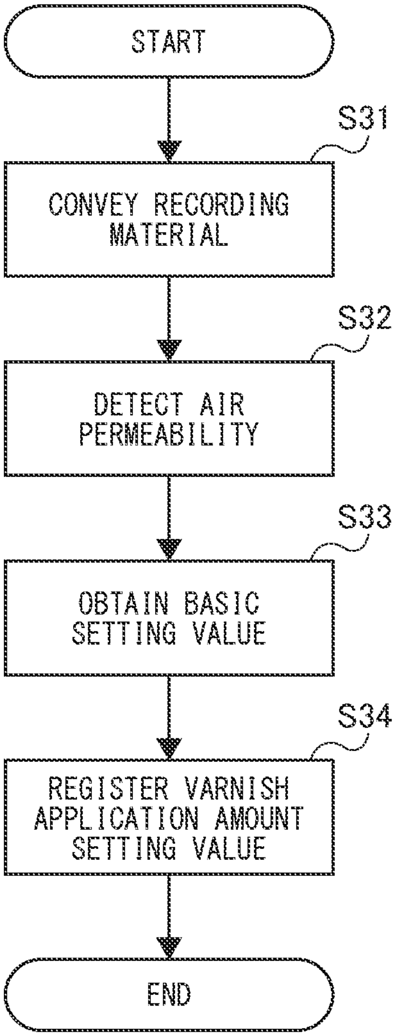
FIG. 9 is a flowchart illustrating registration processing.

By the way, in the first and second embodiments described above, since the varnish is applied according to the varnish application amount setting value corresponding to the grammage or air permeability of the recording material S with reference to the "application amount setting table" (see FIG. 5), it is possible to support only the recording materials S stored in the "application amount setting table". However, the user may want to use a recording material S other than the recording materials S stored in the "application amount setting table". In view of this point, it is preferable that the user can add a "varnish coating setting value" related to a new recording material S to the "application amount setting table". Hereinafter, "registration processing (registration mode)" for implementing the above configuration will be described. FIG. 9 is a flowchart illustrating the registration processing. Although not illustrated, the "registration processing" according to the present embodiment is started by the main control unit 101, for example, in response to an operation of a registration start button (not illustrated) on the initial screen displayed on the display unit 95*b* by the user.

Registration Setting Processing

As illustrated in FIG. 9, in the image forming apparatus 100, the main control unit 101 conveys the recording material S to be registered in the "application amount setting table" (see FIG. 5) to the registration roller 12 and temporarily stops the recording material S (S31). Then, the main control unit 101 detects the air permeability of the recording material S by the air permeability detection unit 600 (S32). That is, the main control unit 101 controls the blower fan 601 to blow air to the recording material S temporarily stopped at the position of the registration roller 12, and obtains the air permeability of the recording material S based on the air volume acquired from the air volume sensor 602 accordingly. At this time, as described above, the main control unit 101 obtains the air permeability of the recording material S based on the acquired air volume detected by the air volume sensor 602 according to the relationship between the air volume and the air permeability illustrated in FIG. 8. After obtaining the air permeability of the recording material S, the main control unit 101 discharges the blank recording material S. Then, the main control unit 101 obtains the basic setting value based on the air permeability of the recording material S (S33). The main control unit 101 obtains the basic setting value according to a relationship between the air permeability and the basic setting value illustrated in FIG. 10.

Figure 10:
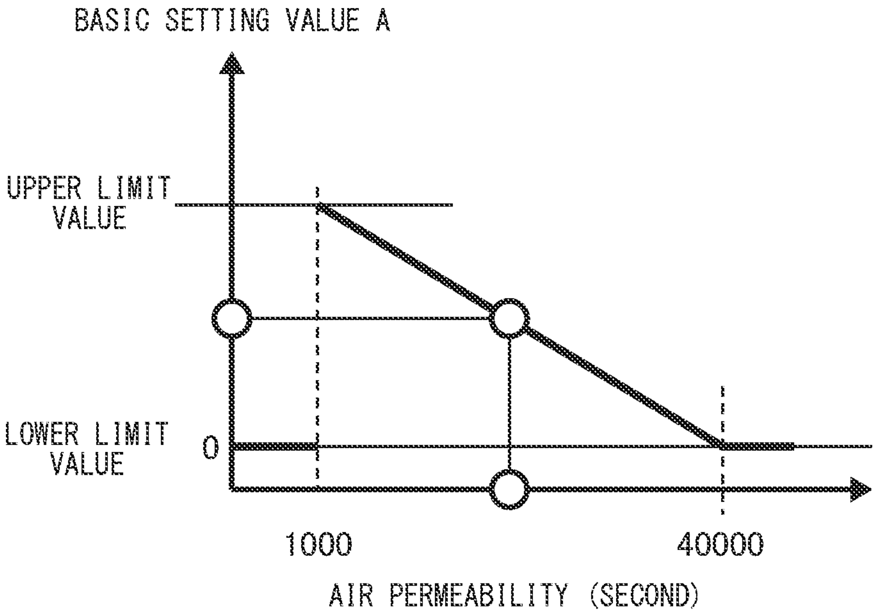
FIG. 10 is a graph illustrating a relationship between the air permeability and a basic setting value.

FIG. 10 illustrates the relationship between the air permeability of the recording material S and the basic setting value. As illustrated in FIG. 10, the air permeability (seconds) and the basic setting value (g/m$^2$) are in an inverse proportional relationship, and the higher the air permeability of the recording material S, that is, the more easily the varnish permeates the recording material S, the smaller the basic setting value. As described above, as the air permeability of the recording material S increases, the permeability of the varnish into the recording material S decreases. In other words, as the air permeability of the recording material S decreases, the permeability of the varnish into the recording material S increases. Therefore, the basic setting value is set to a larger value for the recording material S having a low air permeability than for the recording material S having a high air permeability.

Returning to FIG. 9, the main control unit 101 registers the basic setting value obtained according to the relationship between the air permeability and the basic setting value illustrated in FIG. 10 in the "application amount setting table" together with other information on the recording material S (the sheet type, the grammage, the brand, the air permeability, and the like). Furthermore, the main control unit 101 sets the correction value to "0", and registers, in the "application amount setting table", the varnish application amount setting value calculated as indicated by the above-described Expression (1) (S34). At this time, the "application amount setting table" as illustrated in FIG. 5 including the recording material S to be newly registered may be displayed on the display unit 95*b*, and the registration button (not illustrated) may be operated by the user, so that the main control unit 101 completes the registration. The user may appropriately change the basic setting value for varnish coating registered in the "application amount setting table" through the operation unit 95. In addition, the user may appropriately change and input the air permeability of the recording material S corresponding to the basic setting value registered in the "application amount setting table" through the operation unit 95. Furthermore, the air permeability of the recording material S registered in the "application amount setting table" may be appropriately inputtable by the user through the operation unit 95.

In the example illustrated in FIG. 10, in a case where the air permeability is "1000 or less", the basic setting value is "0". Since the recording material S whose basic setting value is "0" is, for example, a plain paper sheet or the like of which the grammage is less than "50 g/m$^2$" and for which it is difficult to apply the varnish due to the permeability, such a recording material S is not registered in the "application amount setting table".

As described above, according to the present embodiment, it is possible to register a new recording material S in the "application amount setting table". As a result, the varnish application amount can be set based on the grammage or air permeability of the recording material even for the recording material S for which the varnish application amount could not be set hitherto. Therefore, printing can be performed, in the varnish application mode in which the varnish is applied, on the recording material S on which only printing in the normal mode could be performed hitherto, which is preferable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to readout and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172136, filed Oct. 21, 2021, which is hereby incorporated by reference herein in its entirety.

What is claimed is:

1. An image forming system comprising:

an image forming apparatus configured to form a toner image on a recording material;

a varnish application apparatus configured to apply a varnish to the recording material; and a control unit configured to control the image forming apparatus and the varnish application apparatus to execute an image forming job for forming the toner image on the recording material and applying the varnish, wherein the control unit is configured to apply a first application amount of varnish to the recording material per unit area in a case of executing the image forming job for forming a varnish layer on a recording material having a first grammage, and is configured to apply a second application amount of varnish to the recording material per unit area in a case of executing the image forming job for forming the varnish layer on a recording material having a second grammage lower than the first grammage, the second application amount being higher than the first application amount.

2. The image forming system according to claim 1, wherein the control unit is configured to apply the first application amount of varnish to the recording material per unit area in a case of executing the image forming job for forming the varnish layer on a recording material having a first air permeability, and is configured to apply the second application amount of varnish to the recording material per unit area in a case of executing the image forming job for forming the varnish layer on a recording material having the same grammage as that of the recording material having the first air permeability, and having a second air permeability lower than the first air permeability, the second application amount being higher than the first application amount.

3. The image forming system according to claim 1, further comprising:

a storage configured to store a reference value of a varnish application amount for each type of recording material; and an input unit configured to input an application amount correction value for adjusting an application amount of the varnish to be applied to the recording material at a time of executing the image forming job by correcting the reference value of the varnish application amount stored in advance.

4. The image forming system according to claim 2, further comprising:

a detection unit provided in the image forming apparatus and configured to detect an air permeability of the recording material before the toner image is formed; and a storage configured to store a reference value of a varnish application amount for each type of recording material, wherein the control unit is configured to execute a registration mode in which the detection unit detects the air permeability of the recording material in the image forming apparatus, and the reference value corresponding to the detected air permeability is set in the storage based on a preset relationship between the air permeability of the recording material and the reference value of the varnish application amount.

5. The image forming system according to claim 4, further comprising a display unit, wherein the control unit is configured to display, on the display unit, a type of the recording material corresponding to the air permeability detected in the registration mode and the reference value set in the registration mode, at a time of executing the registration mode.

6. The image forming system according to claim 4, further comprising an input unit configured to input the air permeability of the recording material stored in the storage.

7. The image forming system according to claim 1, wherein the varnish is an ultraviolet curable varnish, and the varnish application apparatus comprises an application unit configured to apply the varnish to the recording material, and an irradiation unit configured to irradiate the varnish applied to the recording material with ultraviolet rays.

8. An image forming system comprising:

an image forming apparatus configured to form a toner image on a recording material;

a varnish application apparatus configured to apply a varnish to the recording material;

a control unit configured to control the image forming apparatus and the varnish application apparatus to execute an image forming job for forming the toner image on the recording material and applying the varnish; and a detection unit provided in the image forming apparatus and configured to detect an air permeability of the recording material before the toner image is formed, wherein the control unit is configured to apply a first application amount of varnish to the recording material per unit area in a case of executing the image forming job for forming a varnish layer on a recording material having a first air permeability, and is configured to apply a second application amount of varnish to the recording material per unit area in a case of executing the image forming job for forming the varnish layer on a recording material having a second air permeability lower than the first air permeability, the second application amount being higher than the first application amount.

* * * * *